(12) United States Patent
Loxterkamp et al.

(10) Patent No.: US 7,748,480 B2
(45) Date of Patent: Jul. 6, 2010

(54) CONTROL SYSTEM HAVING RETURN-TO-NEUTRAL BIASING MECHANISM AND VEHICLE INCORPORATING SAME

(75) Inventors: Joe A. Loxterkamp, Beatrice, NE (US); Craig A. Willoughby, Beatrice, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 337 days.

(21) Appl. No.: 12/017,397

(22) Filed: Jan. 22, 2008

(65) Prior Publication Data
US 2009/0217636 A1    Sep. 3, 2009

(51) Int. Cl.
*B62D 11/00* (2006.01)
(52) U.S. Cl. .............. 180/6.48; 180/19.1; 180/335
(58) Field of Classification Search ....... 180/19.1–19.3, 180/6.48, 335
See application file for complete search history.

(56) References Cited

U.S. PATENT DOCUMENTS

| 5,301,568 | A | 4/1994 | Kono |
| 6,161,637 | A | 12/2000 | Decker et al. |
| 7,500,804 | B2* | 3/2009 | Nelson et al. ............. 404/128 |
| 7,520,114 | B2* | 4/2009 | Bergsten et al. ............. 56/14.7 |
| 7,568,406 | B2* | 8/2009 | Booher et al. ............. 74/512 |
| 7,624,996 | B2* | 12/2009 | Velke et al. ............. 280/32.7 |
| 2002/0026779 | A1* | 3/2002 | Velke et al. ............. 56/320.2 |
| 2002/0092685 | A1* | 7/2002 | Hauser ............. 180/6.3 |
| 2003/0006074 | A1* | 1/2003 | Ishikawa et al. ............. 180/19.1 |
| 2006/0218887 | A1* | 10/2006 | Osborne ............. 56/10.8 |
| 2009/0065272 | A1* | 3/2009 | Martin et al. ............. 180/19.3 |

OTHER PUBLICATIONS

"Lazer Z® HP Operator's Manual," *Exmark® Mfg. Co. Inc.*, Part No. 109-0036 Rev A, 2005.
"Lazer Z® HP Parts Manual," *Exmark® Mfg. Co. Inc.*, Part No. 109-4654 Rev A, 2006.

* cited by examiner

*Primary Examiner*—Lesley Morris
*Assistant Examiner*—Tashiana Adams
(74) *Attorney, Agent, or Firm*—Mueting, Raasch & Gebhardt, P.A.

(57) ABSTRACT

A control system for use with a ground maintenance vehicle such as a lawn mower. The control system may include one or more control handles movable between a neutral position and at least a first drive or reverse position. The system may further include a biasing mechanism operable to bias the control handle from the first drive position to the neutral position. The biasing mechanism may be pre-deflected when the control handle is in the neutral position, yet provide little or no biasing effect to the handle until the handle is moved towards the first drive position.

26 Claims, 5 Drawing Sheets

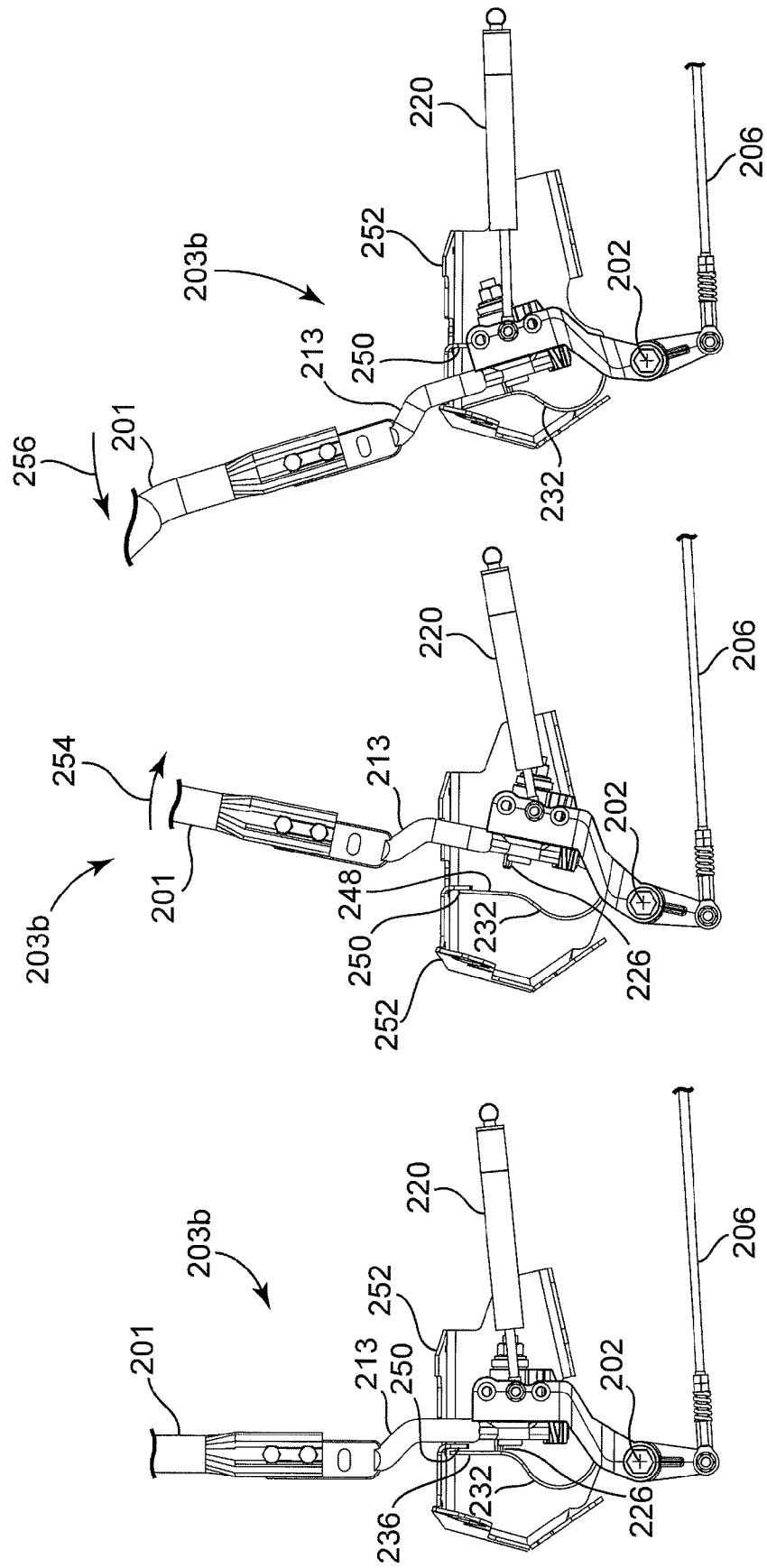

CONTROL SYSTEM HAVING RETURN-TO-NEUTRAL BIASING MECHANISM AND VEHICLE INCORPORATING SAME

TECHNICAL FIELD

The present invention relates generally to control systems for use with vehicles such as riding lawn mowers, and, more particularly, to a control system having a biasing mechanism for returning a control handle to a neutral position, and to a vehicle having such a control system.

BACKGROUND

Ground maintenance vehicles for performing a variety of tasks are known. For instance, vehicles designed for (or having attachments useful for) mowing, fertilizing, aerating, detaching, vacuuming/blowing, and the like are available. While the present invention is applicable to most any such vehicle or, for that matter, to most any type of riding or walk-behind vehicle, it will, for the sake of brevity, be described with respect to riding lawn mowers.

Traditional riding mowers, e.g., those typically having four wheels wherein the front wheels are conventionally steerable, are in common use by homeowners and professionals alike. However, for professional landscape contractors and others mowing lawns having numerous obstacles, tight spaces, and/or intricate borders, mowers having zero-radius-turning (ZRT) capability are often preferred. As the name implies, "ZRT" generally indicates a vehicle having a small turning radius, i.e., a vehicle that is highly maneuverable.

ZRT riding mowers, like other ZRT vehicles, typically include a frame or chassis and at least one drive wheel located on each side (left and right) of the chassis. The drive wheels may be independently powered by a vehicle engine (e.g., via a hydraulic motor) so that, while one wheel may rotate in a first direction at a first speed, the other wheel may rotate in the same or different direction at the same or different speed. Rotating one drive wheel for forward motion while simultaneously slowing, stopping, or rotating the other drive wheel for rearward motion, may cause the mower to spin generally about a turning center located between the drive wheels, thus executing a sharp turn. Typically, the mower includes one or more other wheels, e.g., front caster wheels, in addition to the drive wheels to support the remaining weight of the mower.

While configurations vary, the drive wheels are often controlled by a twin lever control system. In this configuration, two motion control levers are typically provided and positioned side-by-side in front of the operator. Each control lever may be operatively connected to (and thus independently control) a particular drive wheel (e.g., the left lever may control the speed and direction of the left drive wheel, while the right lever may provide the same control for the right drive wheel). When the control levers are advanced forwardly in unison from a neutral position, the drive wheels may cause the mower to move forwardly in a straight line. Similarly, when the control levers are retracted in unison from the neutral position, the drive wheels may cause the mower to move in the reverse direction. Steering may be accomplished by differential movement of the control levers.

When either control lever is retracted to produce rearward movement of the mower, it may be beneficial to provide a mechanism that returns the control lever to its neutral position once the retraction force is removed. Such a feature may further provide a detectable change in required actuating force as the control lever passes through its neutral position. This function has sometimes been accomplished with, for example, a tie rod and coil spring mechanism, wherein the coil spring biases the respective lever (which is connected to the tie rod) towards the neutral position. While effective, this mechanism generally utilizes multiple components. Moreover, variability in the assembly and installation of the tie rod and spring may necessitate time-consuming adjustment of the mechanism during or after manufacturing to ensure the correct biasing force is provided.

SUMMARY

The present invention may overcome these and other issues with known control systems by providing a return-to-neutral biasing mechanism for a control handle, and to vehicles incorporating same. In one embodiment, a self propelled vehicle is provided having a chassis supported for movement over a ground surface by a plurality of ground engaging members including at least one powered drive member. A control handle is also provided and includes an arm coupled to the chassis for pivotable movement of the control handle about a pivot axis. The control handle is movable, in a first direction, from a neutral position to a first drive position. A biasing mechanism is also provided to urge the control handle from the first drive position towards the neutral position. The biasing mechanism includes a unitary elongate element having a first portion attachable to a mounting portion of either the arm or the chassis. The elongate element is configured to deflect as the control handle moves from the neutral position towards the first drive position. The elongate element is, when the control handle is in the neutral position, initially deflected by contact of the elongate element with a protrusion spaced-apart from the mounting portion.

In another embodiment, a self propelled riding lawn mower is provided having a chassis supported for movement over a ground surface by a plurality of ground engaging wheels including at least one powered drive wheel. A control handle is also included having an arm coupled to the chassis for pivotable movement of the control handle about a pivot axis, wherein the control handle is movable in a first direction from a neutral position to a reverse position, and in a second, opposite direction from the neutral position to a forward position. A biasing mechanism is also provided to urge the control handle from the reverse position towards the neutral position. The biasing mechanism includes a unitary elongate element having: a first end attachable to the arm; and a second end positioned to contact an abutting surface of the chassis when the control handle moves towards the reverse position. The elongate element is pre-deflected by contact of the elongate element with a protrusion of the arm.

In yet another embodiment, a riding lawn mower is provided including a chassis supported for movement over a ground surface by a plurality of ground engaging wheels including left and right powered drive wheels. A control handle operatively connected to each powered drive wheel is also provided, wherein each control handle includes an arm pivotally coupled to the chassis for pivoting of the control handle in a first direction about a transverse pivot axis of the mower from a neutral position to a reverse position. The arm also includes a rigid standoff protruding outwardly from the arm. A biasing mechanism is also included to urge each control handle from the reverse position towards the neutral position. The biasing mechanism includes: a unitary elongate element having first and second end segments and an intermediate curved segment. The first segment is clamped to the arm at a location spaced-apart from the standoff. The standoff of the arm contacts the second segment and imparts an initial deflection to the elongate element when the control handle is in the neutral position.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 4A and 4B illustrate an exemplary biasing mechanism (e.g., elongate element) for use with the control assemblies of FIGS. 2-3, the biasing mechanism shown in an undeflected configuration, wherein: FIG. 4A is a perspective view; and FIG. 4B is a side elevation view; and FIGS. 5A-5C are partial side elevation views of the right control assembly of FIGS. 2-3, wherein: FIG. 5A illustrates the control assembly (e.g., control handle) in a neutral position; FIG. 5B illustrates the same in a first drive or reverse position; and FIG. 5C illustrates the same in a second drive or forward position.

Figure 1:
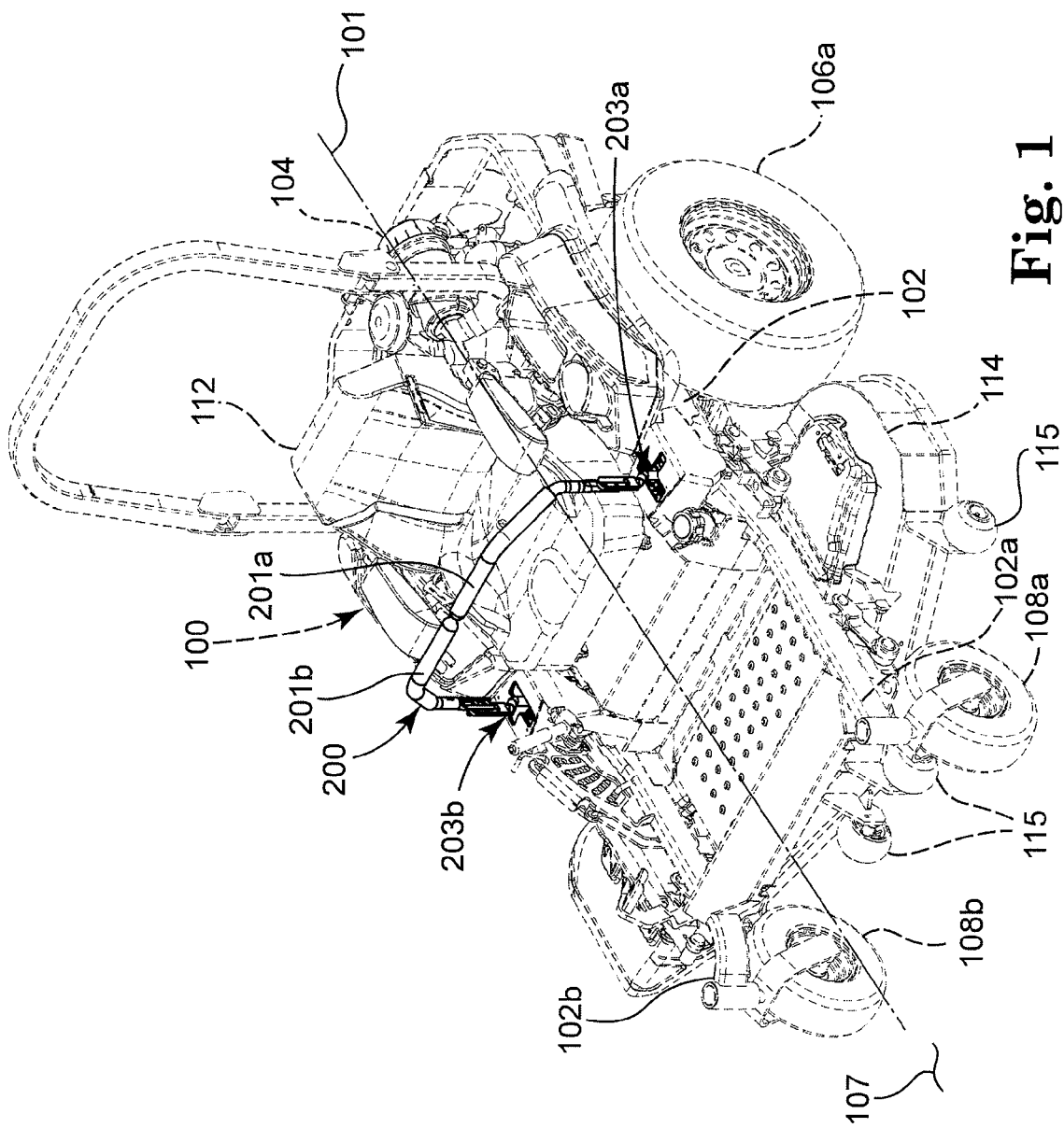
FIG. 1 illustrates a vehicle, e.g., a ZRT riding mower, incorporating a twin lever control system, e.g., left and right control assemblies, in accordance with one embodiment of the invention.

The figures are rendered primarily for clarity and, as a result, are not necessarily drawn to scale. Moreover, various structure, e.g., mower structure, may be removed from these views where beneficial to clarify the various embodiments of the invention.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the invention.

Generally speaking, the present invention is directed to a control system incorporating at least one control assembly (e.g., a control handle and an associated biasing mechanism) for returning a control handle from a first drive position to a neutral position, and to vehicles incorporating the same. In some embodiments, the vehicle may be a self-propelled vehicle, e.g., a ZRT riding vehicle having a control system that includes both left and right control assemblies to control, respectively, left and right drive members, e.g., wheels.

Each control assembly may include a control handle that is movably, e.g. pivotally, coupled to a chassis of the vehicle for pivoting about an axis transverse to a longitudinal axis of the vehicle. In the illustrated embodiments, each handle may be movable (pivoted) in a first direction (e.g., rearwardly) from the neutral position to the first drive (e.g., reverse) position, which corresponds to rearward movement of the respective drive wheel. Each handle may further be pivoted in a second, opposite direction (e.g., forwardly) from the neutral position to a second drive (e.g., forward) position corresponding to forward movement of the respective drive wheel.

As used herein, "longitudinal axis" or "longitudinal direction" refers to the long axis of the mower 100, e.g., the axis 101 extending in the fore-and-aft direction as shown in FIG. 1 during straight travel. A "transverse axis" refers to an axis extending side-to-side, e.g., an axis that is perpendicular to the longitudinal axis of the vehicle.

Further, as used herein, relative terms such as "left," "right," "fore," "forward," "aft," "rearward," "top," "bottom," "upper," "lower," "horizontal," "vertical," and the like are, if used, from the perspective of one operating the mower 100 from a seat 112 while the mower is in an operating configuration, e.g., while the mower 100 is positioned such that the wheels 106, 108, rest upon a generally horizontal ground surface 107 as shown in FIG. 1. These terms are used herein only to simplify the description, however, and not to limit the scope of the invention in any way.

The reference numeral suffixes "a" and "b" may be used throughout this description to denote left and right side versions, respectively, of otherwise substantially similar parts or part features. Unless otherwise noted, the description of an individual part/feature (e.g., the description of a part/feature identified with an "a" suffix) may also apply to the corresponding part/feature (e.g., the part/feature identified with a "b" suffix). Similarly, unless otherwise noted, the description of a part/feature identified with no suffix may apply to both the part/feature identified with the "a" suffix and the "b" suffix.

Each control assembly may further include a biasing mechanism. Biasing mechanisms in accordance with embodiments of the present invention may provide sufficient biasing force to the respective control handle to consistently return each handle from at least the first drive (reverse) position to the neutral position. As a result, release of the handle from the reverse position may result in movement of the handle back to the neutral position, thus stopping rotation of the respective drive wheel.

FIG. 1 shows a self propelled ground maintenance vehicle, e.g., a mid-mount ZRT power mower 100, incorporating a control system 200 in accordance with one embodiment of the present invention. The control system 200, as further described below, may include left and right control assemblies 203a and 203b, respectively. Each control assembly 203a and 203b may include, among other components, a control handle 201 and a biasing mechanism 230 (further described below with reference to FIGS. 2 and 3).

While described herein as using a twin handle control system, it is to be understood that this configuration is not limiting as embodiments of the present invention may find application to vehicles having other, e.g., single, control handle configurations without departing from the scope of the invention. Moreover, while the invention is herein described with respect to a particular riding mower configuration, those of skill in the art will realize that embodiments of the invention are equally applicable to mowers of most any configuration, e.g., walk-behind mowers, or, for that matter, to most any other utility or other vehicle that utilizes one or more similar control handles.

As shown in FIG. 1, the mower 100 may include a frame or chassis 102 supporting a prime mover, e.g., internal combustion engine 104. A pair of transversely opposing, ground engaging drive members, e.g., powered wheels 106 (only left wheel shown), may also be provided. The drive wheels 106 may be independently powered by the engine 104 for propelling the mower 100 during operation. The engine may power the wheels 106 via independent hydrostatic wheel motors 105 (one schematically illustrated in FIG. 2) as are known in the art.

The control system, e.g., the left and right control levers or handles 201, may be provided to permit control of mower speed and direction from the operator station or seat 112. A pair of front ground engaging members, e.g., swiveling caster wheels 108, may, along with the drive wheels 106, support the chassis 102 for movement over the ground surface 107.

Although the illustrated mower has the drive wheels 106 in the rear, this configuration is not limiting. For example, other embodiments may reverse the location of the drive wheels, e.g., drive wheels in front and caster or steerable wheels in the back. Moreover, other configurations may use different wheel configurations altogether, e.g., a tri-wheel configuration. Accordingly, other vehicle embodiments are certainly possible without departing from the scope of the invention.

A cutting deck 114 may be operatively mounted to the lower side of the frame 102 generally between the drive wheels 106 and the caster wheels 108. The cutting deck 114 may include one or more cutting blades (not shown) as known in the art which are operatively powered by the engine 104. During operation, power is selectively delivered to the cutting deck 114, whereby the blades rotate at a speed sufficient to cut grass and other vegetation as the cutting deck 114 passes over the ground surface 107. The cutting deck 114 may optionally include deck rollers 115 to assist in supporting the cutting deck 114 relative to the ground surface during operation.

Figure 2:
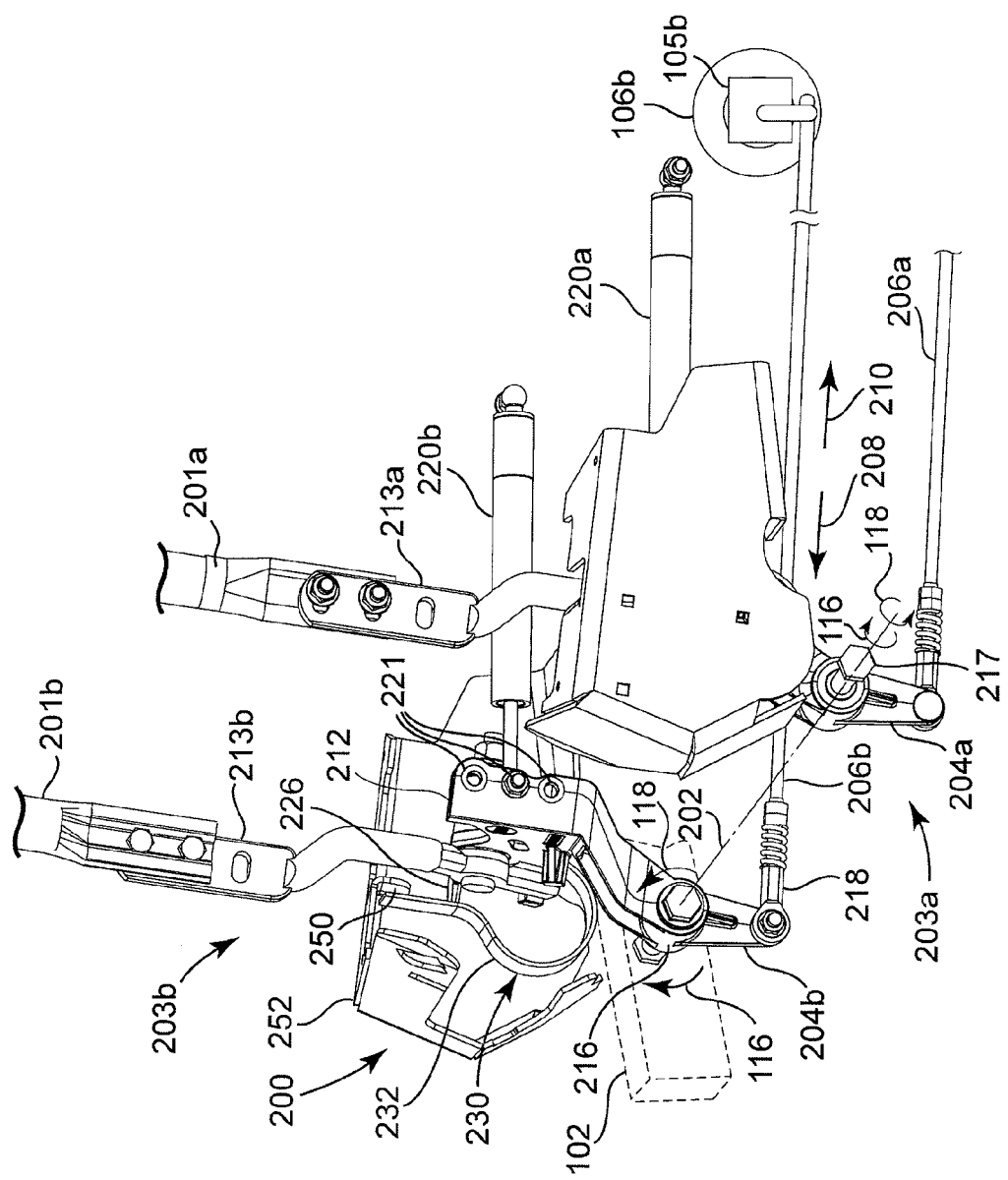
FIG. 2 is an enlarged partial left side perspective view of the left and right control assemblies of FIG. 1 further illustrating a return-to-neutral biasing mechanism in accordance with one embodiment of the invention.

With this general overview, FIG. 2 provides an enlarged left side (e.g., viewed from the left side of the mower) perspective view of the control system 200, e.g., the left and right control assemblies 203a and 203b, respectively. This view further illustrates a biasing mechanism 230 (visible only on the assembly 203b) in accordance with one embodiment of the invention.

Figure 3:
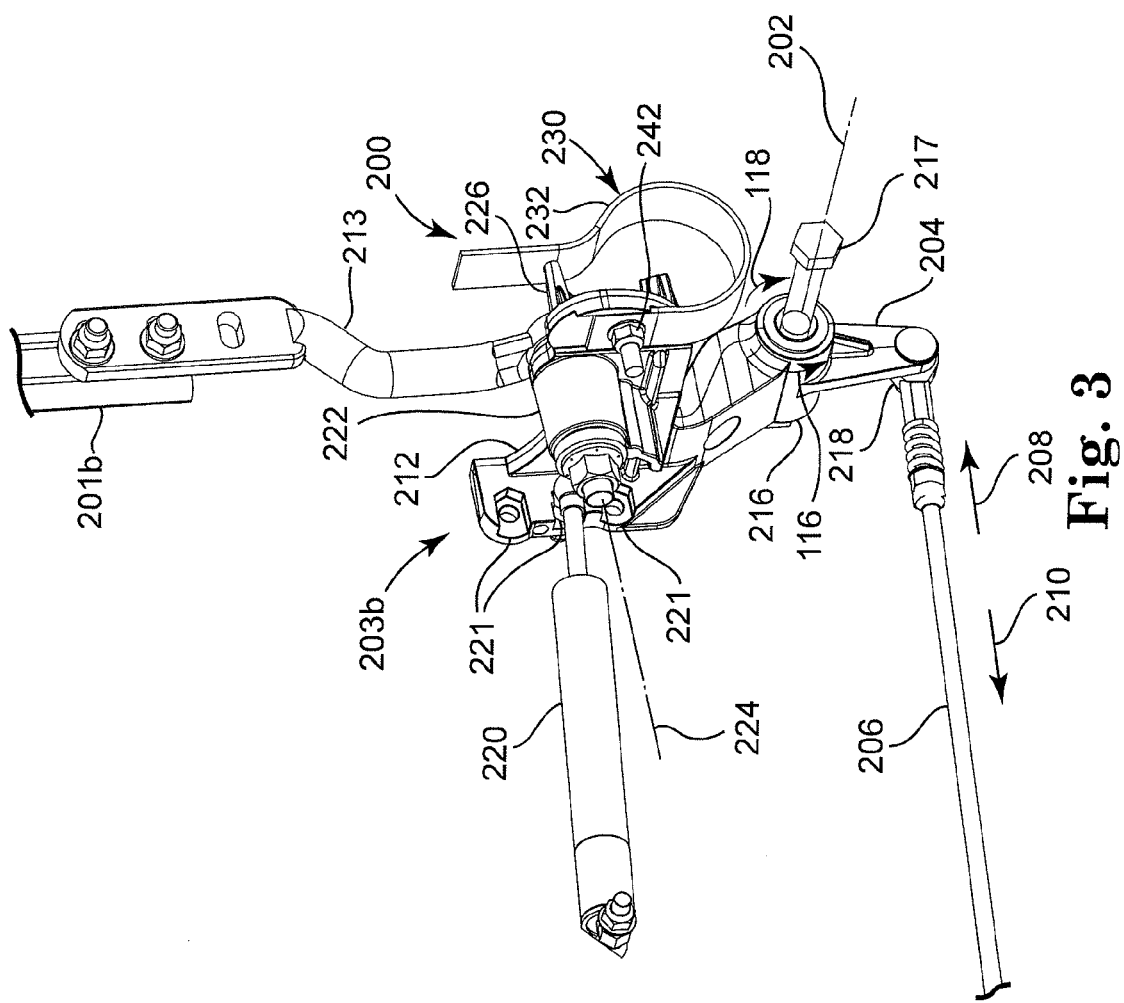
FIG. 3 is an enlarged partial right side perspective view of a single (e.g., right) control assembly of FIG. 2.

To further illustrate the biasing Mechanism, FIG. 3 provides a right side perspective view of only the right control assembly 203b (as with FIG. 2, some structure is removed in FIG. 3 for clarity). Views of the left control assembly 203a would be substantially identical to, e.g., mirror images of, the respective views provided in FIGS. 2 and 3.

As already described herein, each control handle 201 may be pivotally coupled to the chassis 102 (see FIG. 2) for pivotal movement about a pivot axis, e.g., a transverse pivot axis 202. Each handle 201 may be pivotable from a first or neutral position (as shown in FIG. 2) in either a first direction 116 or a second direction 118. The first direction 116 may correspond to rearward movement of the handle 201 to a reverse position, while the second direction 118 may correspond to forward movement of the handle to a forward position.

As the handle 201 pivots about the axis 202, a bellcrank 204 associated with each handle imparts translational movement to a connected tie rod 206. A distal end of the tie rod 206 may attach to a lever arm of a hydraulic pump (not shown) that directs oil to a hydrostatic motor 105 (the motor 105 illustrated diagrammatically in FIG. 2). In the illustrated embodiment, the tie rod 206 may include rod end connections 218 at one or both ends to permit out-of-plane travel. The position of the lever arm of the hydraulic pump may control the rotational speed and direction of the hydrostatic motor and its associated drive wheel 106.

In one embodiment, each handle 201 is operatively coupled (e.g., via the hydraulic pump) to a separate hydrostatic motor 105 that, in turn, has its output shaft coupled to one of the drive wheels 106. As a result, movement of either handle 201 about the axis 202 in the direction 116 causes movement of the associated tie rod 206 in the direction 208, which may produce rotation of the respective hydrostatic motor 105 and drive wheel 106 in the reverse travel direction. Similarly, movement of either handle 201 about the axis 202 in the direction 118 causes movement of the associated tie rod 206 in the direction 210, which may produce rotation of the respective hydrostatic motor 105 and drive wheel 106 in the forward travel direction. The degree to which the handles 201 are pivoted controls the speed output of the respective hydrostatic motor/drive wheel.

As shown in FIG. 3, each control assembly 203 may include an arm 212. The arm 212 may form part of the handle 201 (e.g., be integral to the handle or otherwise be operatively attached to the handle, for example, using an attachment member 213). In one embodiment, the arm 212 may be a metal casting forming a journalled pivot joint 216 that couples to the chassis 102 (see FIG. 2), e.g., with a bolt 217, such that the arm (e.g., the handle 201) may pivot about the pivot axis 202. The arm may further form the bellcrank 204 for pivotal connection with the tie rod 206. The arm 212 may also include a portion e.g., a rigid protrusion or standoff 226 as shown in FIGS. 2 and 3, for initially deflecting the biasing mechanism 230 as further described below. In one embodiment, the standoff 226 may protrude outwardly from the arm in a direction tangent to the transverse pivot axis 202.

The arm 212 may form a pivot joint 222 for receiving an end of the attachment member 213 such that the attachment member and arm may pivot about a handle pivot axis 224 (see FIG. 3). In one embodiment, the axis 224 is contained within a vertical plane that is orthogonal to the transverse pivot axis 202. The pivot joint 222 may permit movement of the handles 201 inwardly and outwardly to better accommodate operator ingress/egress.

Each control assembly 203 may further include a damper 220 having a first end attached to the arm 212 and a second end attached to the chassis 102. The damper may assist in limiting the speed via which the handle may be pivoted about the axis 202 during operation. To customize the dampening effect, the arm may include multiple attachment points 221 as shown in FIGS. 2 and 3.

Figure 4A:
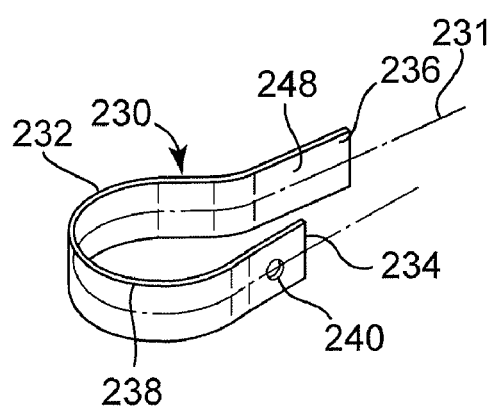
Figure 4B:
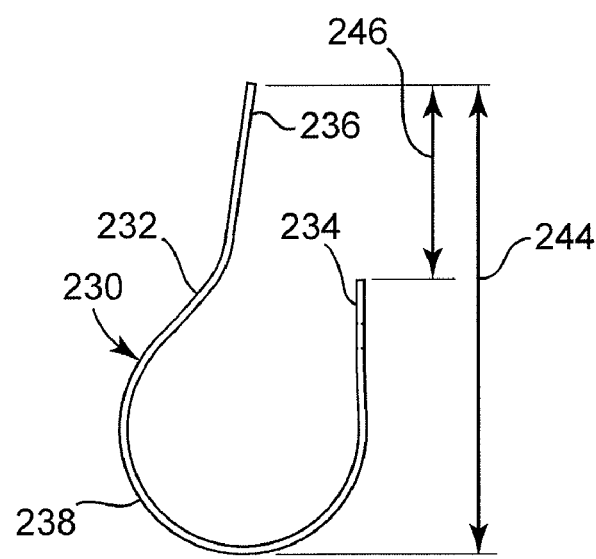

FIGS. 2 and 3 further illustrate a biasing mechanism 230 in accordance with one embodiment of the invention. In this embodiment, the biasing mechanism 230 includes a unitary elongate element 232 that is also illustrated, in an undeflected state, in FIGS. 4A and 4B. The elongate element may, as illustrated in the figures, be a formed strip of material having a rectangular cross section. In one embodiment, the elongate element may be defined by a first portion (e.g., a first end or end segment 234), a second portion (e.g., a second end or end segment 236), and an intermediate curved segment 238. In some embodiments, the curved intermediate segment 238 may span an arc of at least 90 degrees, e.g., at least 180 degrees. As a result, the elongate element 232 may be hook- or J-shaped as shown in the figures. Alternatively, the elongate element could be generally U-shaped.

Such configurations may yield an elongate element 232 wherein a surface 248 of the second end segment 236 is positioned to approximately oppose a surface of the first end segment 234 for reasons that are further described below. However, these opposing configurations are not limiting as other embodiments may utilize elongate elements having other shapes. For example, the elongate element could, where space permits, be straight. In another embodiment, the elongate element may be L-shaped, e.g., configured with two generally orthogonal segments that are joined by an intermediate curved segment (or a sharp bend) of about 90 degrees. Such embodiments of the elongate element may still provide both a first portion for attaching the element to a mounting portion of the handle (e.g., to the arm) such that the element may be initially deflected (e.g., by the standoff 226). They may also provide a second portion that selectively engages the chassis and further deflects the element as described elsewhere herein.

While the elongate element 232 is described herein as attaching to the handle or arm, such a configuration is not limiting. For example, the elongate element could also attach (e.g., bolt) to a mounting portion of the chassis 102. In this instance, the second or free end of the elongate element would selectively contact the arm or handle. A protrusion or standoff similar to the standoff 226 already described herein could also be provided and spaced-apart from the mounting portion of the chassis to initially deflect the elongate element.

In the illustrated embodiment, an edge of the elongate element 232 may lie generally in a plane, e.g., the element 232 may have a center axis 231 (see FIG. 4A) that is planar. However, other configurations of the elongate element are certainly possible.

The elongate element 232 may be formed of any acceptable resilient material that may elastically deflect over the desired range. While not wishing to be bound to any particular material or configuration, the elongate element may (see FIGS. 4A and 4B), in one embodiment, be made from 1×0.1 thick C1050 spring steel annealed to Rc 44-46. It may be configured to have an overall height 244 (see FIG. 4B) of about 5 inches, and the second end segment 236 may protrude a distance 246 of about 2.1 inches above the first end segment 234. The curved intermediate segment 238 may further have a radius of about 1.25 inches.

As shown in FIG. 3, the first segment 234 of the elongate element 232 may be secured, e.g., clamped, to the arm 212 at a location, e.g., the mounting portion, that is spaced-apart from the standoff 226. In one embodiment, this is accomplished by placing the first end segment 234 such that its interior face abuts a rear side of the arm 212. The arm may include a groove formed therein to receive the element 232. A fastener 242 may then be passed through a hole 240 of the element 232 and an aligned hole on the arm 212 to clamp the element in place.

The standoff 226 may be spaced-apart from the bolt hole of the arm 212 as shown in FIG. 3. Accordingly, as the bolt 242 is tightened, the elongate element 232 may be drawn into contact with the standoff 226 as shown. When fully clamped in place, the standoff 226 may impart an initial minimum deflection to, or otherwise pre-deflect, the elongate element even when the control handle is in the neutral position. The amount of deflection may be selected based upon the desired initial spring force of the element 232.

FIGS. 5A-5C illustrate one of the control assemblies, e.g., control assembly 203b, during operation. FIG. 5A illustrates the control assembly, e.g., handle 201, in the neutral position (same position illustrated in FIGS. 2 and 3). As is evident in this view, the biasing mechanism 230, e.g., elongate element 232, may be in its initial pre-deflected configuration resulting from attachment to the arm 212 and contact with the standoff 226.

The second end segment 236 may, as described below, be positioned to selectively contact the chassis 102 when the control handle moves towards the first drive position (e.g., the reverse position). For example, when the handle 201 is in the neutral position, the interior surface 248 (see FIG. 4A) of the second end segment 236 is positioned to be in contact with, or immediately adjacent to, an abutting surface 250 (see also FIG. 2) of the chassis 102. In one embodiment, the abutting surface 250 is part of the chassis 102 or is otherwise attached thereto, e.g., the abutting surface 250 could be formed as part of a sheet metal shroud 252 that is rigidly attached to the chassis 102.

When the operator applies a rearward force to the handle 201, e.g., a force in the rearward direction 254 as shown in FIG. 5B, the tie rod 206 causes the associated hydrostatic motor 105 (see FIG. 2) to rotate the connected drive wheel in reverse. As the handle is moved in the direction 254, the surface 248 of the element 232 contacts the abutting surface 250. With the second end segment 236 (see FIG. 4A) of the elongate element generally immobilized by the abutting surface 250, further movement of the handle 201 towards the reverse position causes the elongate element to deflect as shown in FIG. 5B and move away from the standoff 226.

Should the operator reduce or release the force applied to the handle, the biasing force provided by the elastically deflected elongate element 232 causes the handle 201 to move back towards its neutral position (FIG. 5A). When the handle reaches the neutral position, the standoff 226 moves into contact with the surface 248 of the second end segment 236, thereby releasing the biasing force provided by the elongate element. As a result, the handle generally moves to the neutral position and stops. The damper 220 may reduce the chance of the handle overshooting the neutral position.

While the biasing mechanism 230 provides a biasing force to urge the handle 201 towards its neutral position from the first drive or reverse position, the biasing mechanism provides no biasing input between the neutral position and the second engaged or forward position of the handle. That is, the surface 248 of the elongate element 232 may move away from the abutting surface 250 as the control handle 201 moves from the neutral position to the forward position. To illustrate, FIG. 5C shows the handle 201 pivoted in the forward direction as indicated by arrow 256. As shown in this view, the biasing mechanism 230, e.g., elongate element 232, moves with the arm 212 and the element is generally unimpeded by any portion of the chassis 102 or shroud 252.

Embodiments of the present invention thus provide a control system having one or more control handles each incorporating a biasing mechanism that may bias the control handle from the reverse position to the neutral position, but provide little or no biasing effect to the handle as it moves between the neutral position and the forward position. Moreover, the magnitude of the spring force provided by the biasing mechanism may be sufficiently high such that return of the handle from the reverse position to the neutral position may be achieved regardless of frictional variations within the system. As a result, adjustment of the biasing mechanism during manufacturing may be unnecessary. Moreover, the biasing force provided by biasing mechanisms in accordance with embodiments of the present invention may be configured to terminate once the neutral position is reached. Thus, inadvertent handle movement beyond the neutral position (e.g., towards the forward position), may be reduced or eliminated. Moreover, the termination of the biasing force at the neutral position may provide a desirable detectable change in handle actuating force between forward and reverse directions.

Illustrative embodiments of this invention are discussed and reference has been made to possible variations within the scope of this invention. These and other variations, combinations, and modifications of the invention will be apparent to those skilled in the art without departing from the scope of the invention, and it should be understood that this invention is not limited to the illustrative embodiments set forth herein.

Accordingly, the invention is to be limited only by the claims provided below and equivalents thereof.

What is claimed is:

1. A self propelled vehicle comprising:
   a chassis supported for movement over a ground surface by a plurality of ground engaging members including at least one powered drive member;
   a control handle comprising an arm coupled to the chassis for pivotable movement of the control handle about a pivot axis, the control handle movable, in a first direction, from a neutral position to a first drive position; and
   a biasing mechanism to urge the control handle from the first drive position towards the neutral position, the biasing mechanism comprising a unitary elongate element having a first portion attachable to a mounting portion of either the arm or the chassis, wherein the elongate element is configured to deflect as the control handle moves from the neutral position towards the first drive position, and further wherein the elongate element is, when the control handle is in the neutral position, initially deflected by contact of the elongate element with a protrusion spaced-apart from the mounting portion.

2. The vehicle of claim 1, wherein the first portion and the second portion of the elongate element are positioned to oppose one another.

3. The vehicle of claim 1, wherein the elongate element has a center axis that is planar.

4. The vehicle of claim 2, wherein the elongate element comprises a curved segment intermediate the first portion and the second portion.

5. The vehicle of claim 4, wherein the curved segment spans an arc of at least 90 degrees.

6. The vehicle of claim 1, wherein the mounting portion and the protrusion are located on the arm.

7. The vehicle of claim 1, wherein the pivot axis is transverse to a longitudinal axis of the vehicle.

8. A self propelled riding lawn mower comprising:
   a chassis supported for movement over a ground surface by a plurality of ground engaging wheels including at least one powered drive wheel;
   a control handle comprising an arm coupled to the chassis for pivotable movement of the control handle about a pivot axis, the control handle movable in a first direction from a neutral position to a reverse position, and in a second, opposite direction from the neutral position to a forward position; and
   a biasing mechanism to urge the control handle from the reverse position towards the neutral position, the biasing mechanism comprising a unitary elongate element having: a first end attachable to the arm; and a second end positioned to contact an abutting surface of the chassis when the control handle moves towards the reverse position, wherein the elongate element is pre-deflected by contact of the elongate element with a protrusion of the arm.

9. The mower of claim 8, wherein the mower comprises a first control handle to control a first powered drive wheel, and a second control handle to control a second powered drive wheel.

10. The mower of claim 8, wherein the pivot axis is transverse to a longitudinal axis of the mower.

11. The mower of claim 8, wherein the second end of the elongate element moves away from the abutting surface of the chassis when the control handle moves from the neutral position towards the forward position.

12. The mower of claim 8, wherein a surface of the second end opposes the first end of the elongate element.

13. The mower of claim 8, wherein the elongate element comprises a curved segment intermediate the first end and the second end.

14. The mower of claim 13, wherein the curved segment spans an arc of at least 180 degrees.

15. The mower of claim 14, wherein the elongate element is generally J-shaped.

16. The mower of claim 8, wherein the elongate element deflects as the control handle moves towards the reverse position.

17. The mower of claim 8, wherein the elongate element comprises a formed strip of material comprising a rectangular cross section.

18. A riding lawn mower comprising:
   a chassis supported for movement over a ground surface by a plurality of ground engaging wheels including left and right powered drive wheels;
   a control handle operatively connected to each powered drive wheel, each control handle comprising an arm pivotally coupled to the chassis for pivoting of the control handle in a first direction about a transverse pivot axis of the mower from a neutral position to a reverse position, wherein the arm comprises a rigid standoff protruding outwardly from the arm; and
   a biasing mechanism to urge each control handle from the reverse position towards the neutral position, the biasing mechanism comprising a unitary elongate element having first and second end segments and an intermediate curved segment, wherein the first segment is clamped to the arm at a location spaced-apart from the standoff, and further wherein the standoff of the arm contacts the second segment and imparts an initial deflection to the elongate element when the control handle is in the neutral position.

19. The mower of claim 18, wherein the chassis comprises an abutting surface proximate each elongate element, wherein the second end segment of each elongate element contacts the respective abutting surface as the arm moves towards the reverse position.

20. The mower of claim 18, wherein each elongate element deflects as its respective control handle moves towards the reverse position.

21. The mower of claim 18, wherein each standoff extends in a direction tangent to the transverse pivot axis.

22. The mower of claim 18, wherein the elongate element comprises a formed strip of material comprising a rectangular cross section.

23. The mower of claim 18, wherein each elongate element is generally J-shaped.

24. The mower of claim 18, wherein each control handle is further pivotable in a second, opposite direction about the transverse pivot axis from the neutral position to a forward position.

25. The mower of claim 24, wherein a surface of the second end segment of each elongate element is configured to: contact an abutting surface of the chassis when the control handle moves from the neutral position towards the reverse position; and move away from the abutting surface when the control handle moves from the neutral position towards the forward position.

26. The mower of claim 18, wherein each arm may further comprise a pivot joint defining a handle pivot axis contained within a plane that is orthogonal to the transverse pivot axis.

* * * * *